United States Patent [19]

Neumann

[11] Patent Number: 4,797,091

[45] Date of Patent: Jan. 10, 1989

[54] METHOD AND APPARATUS FOR UTILIZING THE HEAT ENERGY OF DOMESTIC AND COMMERCIAL REFUSE

[75] Inventor: Eberhard W. Neumann, Ennigerloh, Fed. Rep. of Germany

[73] Assignee: Krupp Polysius AG, Fed. Rep. of Germany

[21] Appl. No.: 164,085

[22] Filed: Mar. 4, 1988

[30] Foreign Application Priority Data

Mar. 13, 1987 [DE] Fed. Rep. of Germany ....... 3708220

[51] Int. Cl.$^4$ ............................................. F27B 15/00
[52] U.S. Cl. ....................................... 432/14; 110/220; 110/226; 110/229
[58] Field of Search ............... 110/246, 219, 220, 226, 110/229, 232, 346; 432/103, 14, 106; 106/100

[56] References Cited

U.S. PATENT DOCUMENTS

| | | | |
|---|---|---|---|
| 4,063,903 | 12/1977 | Beningson et al. | 112/224 X |
| 4,361,100 | 11/1982 | Himger | 110/229 X |
| 4,640,681 | 2/1987 | Steinbiss et al. | 432/14 |

Primary Examiner—Edward G. Favors
Attorney, Agent, or Firm—Learman & McCulloch

[57] ABSTRACT

The invention relates to a method for utilizing the heat energy of domestic and commercial refuse in a rotary kiln installation. The prepared crude refuse is degassed in a pyrolysis reactor and the pyrolysis gas produced is delivered to the main burner of the rotary kiln, optionally using primary fuel. For optimum and economic production of the pyrolysis gas crushed refuse is dried pneumatically with the aid of exhaust air from the cooler and is delivered to the pyrolysis reactor. The pyrolysis reactor is heated indirectly to a low temperature with hot secondary air from the kiln outlet head and the pyrolysis gas produced is delivered together with used secondary air to the main burner of the kiln.

16 Claims, 2 Drawing Sheets

METHOD AND APPARATUS FOR UTILIZING THE HEAT ENERGY OF DOMESTIC AND COMMERCIAL REFUSE

The invention relates to a method of utilising the heat energy of domestic and commercial refuse in a kiln installation containing a kiln and a cooler arranged after the kiln, especially for the manufacture of mineral structural materials, according to the preamble to claim 1. The invention also relates to apparatus for carrying out this method.

Endeavours have been made for some time to feed waste materials, especially domestic and commercial refuse, to kilns in order to utilise the energy content of the refuse.

It is known, for example, for crushed and pre-sorted domestic and/or commercial refuse to be fed together with other primary fuels, e.g. coal dust, oil, natural gas, to the main furnace of the rotary kiln of kiln installations serving for the manufacture of mineral structural materials, especially cement clinker. A disadvantage of this method is that because of the varying calorific value of the refuse the energy supply has to be kept constant by continuous readjustment of the main burner.

Attempts have also been made to burn refuse in the form of so-called eco-briquettes in the main firing region of the rotary kiln. Because of the density and size of these eco-briquettes the combustion is so unsatisfactory that it is necessary to grind up the briquettes.

A further disadvantage of these previously known methods which are described above is that in the direct combustion of refuse all the pollutants contained in this refuse are introduced into the entire kiln system. This is particularly undesirable in the case of the heavy metals contained in the refuse, since these heavy metals are subjected to temperatures at which they vaporise. For the most part they are bound into the combustion products, but the unbound proportion accumulates in the gas circuits and has to be removed from the kiln system from time to time.

A further disadvantage of the direct combustion lies in the introduction of chlorine which above certain concentrations leads to a kiln shutdown. As a result the maximum quantity of refuse used is restricted as a function of the chlorine content already present.

It is also known for crude refuse which has been presorted and/or crushed to be degassed (pyrolysed) and for the resulting combustible gas to be fed to the secondary firing system of a rotary cement kiln. With this method the heavy metals with the exception of mercury are not introduced into the kiln system but remain in the so-called pyrolysis residue which can be disposed of without danger or can also be ground with the fired cement clinker.

The aforementioned method also suffers from several serious disadvantages: because of the proportion of water contained in the refuse the calorific value of the resulting pyrolysis gas is reduced; the resulting low combustion temperature in combination with higher quantities of exhaust gas restrict the firing rate of the pyrolysis gas. Furthermore the organic pollutants, e.g. chlorinated hydrocarbons, contained in the pyrolysis gas are exposed in the secondary firing system to temperatures which do not ensure the complete destruction of these pollutants. In particular there is the danger that highly toxic dibenzodioxins and dibenzofurans will be formed.

The method according to DE-A No. 327 48 510 proceeds in an approximately similar manner. In this method waste materials of a general nature are degassed in their original composition without further prior treatment or preparation in a pyrolysis reactor which can be a shaft kiln, rotary kiln, fluo-solids kiln, storey kiln, roasting kiln or sintering belt. The pyrolysis gas thus produced can then be supplied to a separate burner and/or a main burner of the rotary kiln (if necessary together with a required proportion of primary fuel), but because of the heterogeneity of the starting materials, particularly when domestic and commercial refuse is used, it is subject to considerable fluctuations as regards its burning properties.

The object of the invention is to avoid the aforementioned disadvantages of the known methods and to provide an improved method of the type set out in the preamble to claim 1 in such a way that the crude refuse is prepared economically, delivered in a uniform state to the pyrolysis reactor and degassed there in an optimum manner, and the organic pollutants still contained in the pyrolysis gas thus produced are completely converted in the main burner of the kiln.

This object is achieved according to the invention by the steps of the method set out in the characterising portion of claim 1.

Apparatus for carrying out this method according to the invention contains features according to the preamble to claim 9 and is distinguished by the further features set out in the characterising portion of claim 9.

Further advantageous embodiments and developments of the invention are the subject matter of the other subordinate claims.

In this method according to the invention at least a light fraction known in the art as so-called "fluff" is prepared to give a pyrolysable valuable material, and at least this crushed fluff is pneumatically dried before or during its delivery to the pyrolysis reactor with the aid of a hot gas stream by means of which in order to obtain the valuable material the fluff is brought to a dry substance content of at least approximately 78%, preferably approximately 88-92%, and which is branched off from the cooler of the kiln installation particularly as exhaust air from the cooler. Thus the valuable material to be fed to the pyrolysis reactor can be made uniform in its material composition, in its grain size composition and above all in its moisture or water content within acceptable limits and thus with comparatively low costs to be delivered to the reactor. This delivery can be carried out particularly economically at least partially by means of the pneumatic transport of the valuable material which is also taking place during the drying. The valuable material prepared in this way can also possibly be conveyed to an intermediate bunker which is arranged before the pyrolysis reactor and from which this valuable material can then be fed in measured quantities to the inlet side of the pyrolysis reactor.

The valuable material thus obtained is then degassed in a low-temperature process in the pyrolysis reactor whilst the said pyrolysis reactor is being indirectly heated. This indirect heating is carried out in an advantageous manner with the aid of hot secondary air taken from the region of the junction between the kiln and the cooler.

If hot secondary air or exhaust air from the cooler of the kiln system cannot be made available, then the heat energy necessary for the drying and reactor heating is generated by means of conventional combustion chamber firing.

In the indirect heating of the pyrolysis reactor care should be taken to ensure that the degasification of the valuable material delivered is carried out in the pyrolysis reactor with air largely, preferably completely, excluded so that combustion processes can be avoided so as not to allow the degasification temperature to rise above the vaporising point above all of the heavy metals or their compounds (with the exception of mercury).

The pyrolysis gas produced in this way, a quantity of primary fuel (e.g. carbon, oil or natural gas) which is usually necessary and the secondary air utilised for the indirect heating of the pyrolysis reactor are delivered to the main burner of the kiln for common combustion. By the use of the secondary air utilised in the pyrolysis reactor it is no longer necessary—by contrast with the known methods—to deliver a corresponding quantity of cold ambient air to the main burner as primary air, i.e. in the method according to the invention used heating gas from the pyrolysis reactor is delivered to the main burner (instead of cold air) as preheated combustion air (primary air).

A degasification temperature of approximately 550° C. to 600° C., preferably in the region of approximately 550° C., and a static absolute pressure between 75 and 110 kPa are advantageously maintained in the pyrolysis reactor in order to produce the pyrolysis gas in the low-temperature region. The combustion of the pyrolysis gas thus produced in the main burner of the kiln advantageously takes place according to the invention at temperatures which clearly lie above 1200° C., so that reliable conversion or destruction of any organic pollutants present in the pyrolysis gas is ensured. This combustion of the pyrolysis gas in the main burner takes place particularly advantageously at a kiln charge temperature of approximately 1450° C. and a flame temperature of approximately 2000° C.

Temperature regulation for the degasification temperature in the pyrolysis reactor can be carried out using regulating means and methods which are known per se and above all by means of the quantity of heat delivered with the hot secondary air. Since the pyrolysis reactor is heated indirectly with the hot secondary air, the latter cannot come into contact with the waste materials from the valuable material to be degassed, so that any partial combustion processes in the pyrolysis reactor are thereby avoided.

The invention will be described in greater detail below with the aid of the drawings, in which.

First of all a first embodiment of the apparatus according to the invention will be explained with the aid of the general diagram according to FIG. 1. This apparatus contains a kiln installation which is largely set out in the usual way and contains a kiln, which is preferably constructed in the form of a conventional rotary kiln, and a cooler 2 which is arranged after the rotary kiln 1 and can also be of essentially conventional construction (e.g. a reciprocating grate cooler, travelling grate cooler or the like). The outlet end 1a of the rotary kiln 1 and the inlet and 2a of the cooler 2 are connected to one another in a manner which is known per se by a kiln outlet head 3.

It may be assumed that this kiln installation serves for the production of mineral structural materials, particularly for the manufacture of cement clinker.

Figure 1:
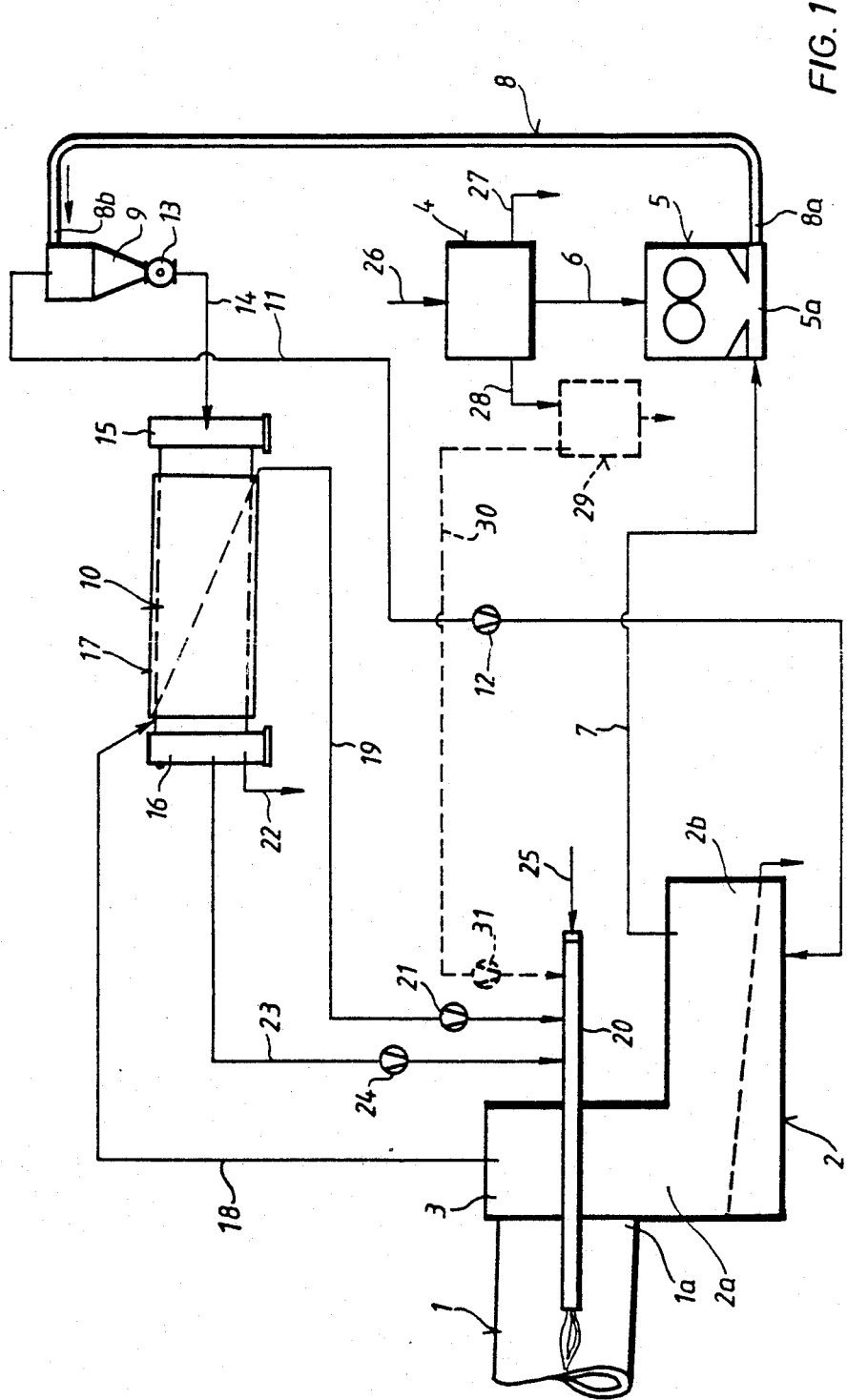
FIG. 1 shows a simplified general diagram of apparatus for carrying out the method according to the invention.

As shown in FIG. 1 the apparatus according to the invention for utilising the heat energy of domestic and commercial refuse also contains a crude refuse preparation installation with a sorting device 4 and a crushing device 5 arranged on the material side after this sorting device 4; the sorting device 4 and the crushing device 5 are connected to one another by a fluff pipe 6. Both the sorting device 5 and the crushing device 5 can be constructed in a suitable and advantageous manner as single-stage or multi-stage devices.

A warm air or drying gas supply pipe 7 coming from the rear end (material outlet end) 2b of the cooler 2 is brought to the lower end 5a or the last stage of the crushing device 5. This drying gas supply pipe 7 opens into the lower end 5a of the crushing device 5 in such a way that it is in flow connection with the delivery end 8a of a pipe run 8. The opposing discharge end 8b of this pipe run 8 opens into a cyclone separator 9. The pipe run 8 and the cyclone separator 9 are essential components of a pneumatic conveyor dryer to which the fluff crushed in the crushing device 5 is fed at the delivery end 8a of the pipe run 8. In this pipe run 8 the crushed fluff is delivered pneumatically to the cyclone separator 9 which is preferably installed near to a pyrolysis reactor 10 which is arranged after it. The pipe run 8 and the cyclone separator 9 are constructed and dimensioned in such a way that in addition to reliable pneumatic conveying of the crushed fluff they can also ensure sufficient drying of this crushed fluff in the desired manner.

After the separation of fluff from the hot gas stream which serves for drying and pneumatic transport the latter is again delivered to a suitable point in the cooler 2 as cooling air via a clean gas pipe 11 which comes out of the cyclone separator and preferably has a blower 12 arranged in it.

The lower closure of the cyclone separator 9 is formed for example by a rotary vane gate 13 which is connected to a feed arrangement 15 at the inlet end of the pyrolysis reactor 10 by means of a pipe 14—and possibly by means of an intermediate bunker which is not illustrated here. It can be particularly advantageous to arrange the cyclone separator 9 in such a way that the dried fluff (valuable material) in the pipe 14 passes under its own weight via the feed arrangement 15 directly into the pyrolysis reactor 10 (or an intermediate bunker for the valuable material arranged before the reactor).

Any suitable indirectly heated pyrolysis reactor, e.g. a fluo-solids reactor, can be used as the pyrolysis reactor. A rotary drum reactor 10 is particularly preferred which can be constructed in a manner which is known per se and can operate through its feed arrangement 15 at its inlet end and through a discharge arrangement 16 at its outlet end largely or completely with external air excluded. This rotary drum reactor 10 is indirectly heated in such a way that the dried valuable material which is delivered can be degassed or pyrolysed at a low temperature of approximately 500° C. to 600° C., preferably in the region of approximately 550° C. and at a static absolute pressure of approximately 75–100 kPa.

In the plant diagram shown in FIG. 1 the rotary drum reactor 10 is only illustrated by way of example with an indirect heating arrangement 17 in the form of a double jacket. Naturally, any other suitable indirect heating arrangement can be provided, e.g. a pipe system passing through the rotary drum reactor 10. However, it is important that the heating arrangement 17 of the rotary drum reactor 10 is connected via a secondary gas pipe 18 to the kiln outlet head 3 of the rotary kiln 1 and/or to a conventional hot gas producer. This heating arrangement 17 is connected via a second gas pipe 19 to a main burner 20 which is associated in the usual manner with the rotary kiln 1 in such a way that the used secondary air which is utilised for indirect heating of the reactor 10 can be delivered to this main burner 20 as warm air. A suitable blower 21 is arranged in this second gas pipe 19.

The rotary drum reactor 10 which is inclined from its inlet end to its outlet end has on its discharge arrangement 16 a discharge pipe 22 for pyrolysis residues and a pyrolysis gas pipe 23 which is also brought to the main burner 20 and contains a separate blower 24.

A fuel supply pipe 25 which is only briefly indicated is also connected to the main burner 20, and any primary fuel, e.g. oil, coal dust, natural gas or the like, which may become necessary can be delivered to the main burner 20 by means of this fuel supply pipe 25. However, in most constructions it is necessary for a regulated quantity of this primary fuel to be delivered continuously to the main burner 20.

Since separate blowers 24, 21 and 12 respectively are arranged in the pyrolysis gas pipe 23, the second gas pipe 19 and the clean gas pipe 11, the quantities of gas flowing in these pipes can be regulated extremely favourably in the manner required in each case.

The apparatus for carrying out the method described above is explained with the aid of the diagram according to FIG. 1 and can be comparatively simply constructed and operated.

However, this method according to the invention can be advantageously developed in such a way that first of all the sorting device 4 is constructed in such a way that it sorts the crude refuse delivered at 26 into three main fractions, namely a first fraction which is to be delivered to the pyrolysis reactor, that is to say the light fraction which is formed by the so-called fluff and is delivered to the crushing device 5 via the fluff pipe, a second fraction which essentially contains noncombustible constituents such as for example sand, ashes, metal (substantially without heavy metals such as mercury), glass, stones and the like and is drawn off via an outlet 27, and a wet fraction of vegetable matter which is drawn off via a separate outlet 28.

According to a simplified first example, the wet vegetable fraction (referred to hereafter as "vegetable matter") which is drawn off through the outlet 28 can be subjected in an advantageous manner to a separate process of further preparation in which—as indicated by broken lines in FIG. 1—it is fed into a separate biogas reactor 29 in order to produce biogas of high calorific value there. This biogas can basically be burnt in any suitable manner at a convenient point. However, it is particularly advantageous and economical if all or at least part of the biogas thus produced is also delivered to the main burner 20 of the rotary kiln 1. For this purpose a biogas pipe 30 is indicated by broken lines in the schematic representation of FIG. 1, and this biogas pipe 30 also connects the biogas reactor 29 to the main burner 20 and advantageously also has arranged in it a separate blower 31 for regulable delivery of the biogas to the main burner 20.

It is basically also possible for the vegetable matter to be delivered to the crushing device 5, the drying stage and then the pyrolysis stage by the fluff pipe 6 through which the greater part of the pyrolysable light fraction, that is to say the fluff, is drawn off. However, the separate process of further preparation of the vegetable matter explained above offers considerable operational advantages.

Figure 2:
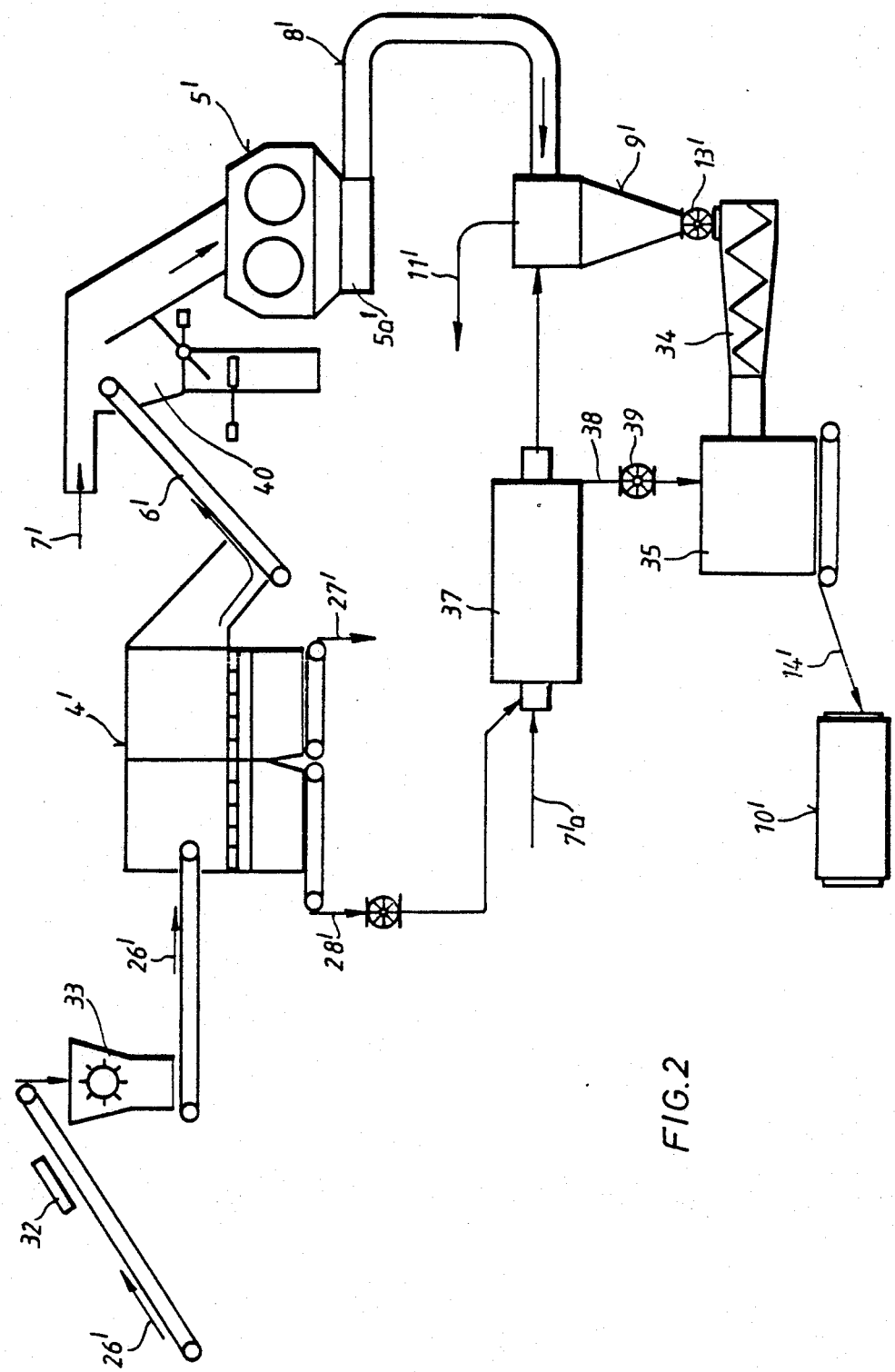
FIG. 2 shows in somewhat greater detail a partial schematic representation in particular for a variant of the preparation arrangement.

A further variant which relates in particular to the preparation and drying in order to obtain the valuable material in the region before the pyrolysis reactor is described with the aid of the partial schematic representation of FIG. 2. This partial schematic representation is rather more detailed than FIG. 1 and in it the parts of the apparatus which are approximately the same as those in FIG. 1 are given the same reference numerals modified by prime, and therefore do not need to be explained in detail again.

In this embodiment the vegetable matter which has been sorted out is subjected to a separate process of further preparation. However, in this case this is achieved by additional drying in such a way that this vegetable matter is also dried in a separate drying arrangement (as will be explained in greater detail below) to a dry substance content of at least approximately 78%, preferably approximately 88-92%, and is then brought together with the dried fluff in the region before the pyrolysis reactor 10'; this dried vegetable matter and the dried fluff then together form the prepared valuable material to be delivered for pyrolysis.

Referring to the partial schematic representation in FIG. 2, the crude refuse (arrow 26') is first of all led past a magnetic separator 32 to a primary crushing device 33 from which the crushed crude refuse (arrow 26') is delivered to the sorting device 4' of the preparation arrangement. In this sorting device 4' the crushed crude refuse is sorted into a pyrolysable light fraction, namely the fluff, a wet vegetable fraction (vegetable matter) and a non-pyrolysable fine refuse fraction.

In a manner similar to that of the example according to FIG. 1 the pyrolysable fluff is first of all delivered via a fluff pipe or a fluff conveyor 6' to the secondary crushing device 5' from the lower end 5a' of which it passes into the pipe run 8' and from there into the cyclone separator 9' of the pneumatic conveyor dryer. The dried fluff precipitated in the cyclone separator 9' now constitutes the valuable material to be pyrolysed and in this case is delivered via a conveyor 34, for example a screw conveyor, to an intermediate bunker 35 arranged before the pyrolysis reactor 10'.

Whereas the non-pyrolysable fine refuse fraction is drawn off in a suitable manner via the outlet 27' of the sorting device 4', the vegetable matter (wet vegetable fraction) is delivered via the outlet 28' and possibly via a rotary vane gate 36 to a suitable drying arrangement which in the illustrated case can be a drying drum 37. The vegetable matter is dried down to the desired dry substance content in this drying drum 37 and is then also delivered via a pipe 38 and optionally a gate 39 to the intermediate bunker 35 so that in this case this dried vegetable matter together with the dried fluff form the valuable material to be delivered to the pyrolysis reactor 10'. The valuable material thus obtained is passed from this intermediate bunker 35 via a pipe 14' in the same way as in the preceding example (FIG. 1), preferably by dosaging, to the pyrolysis reactor 10'.

The pneumatic drying of the crushed fluff after the crushing arrangement 5' takes place in this case too (FIG. 2) with the aid of a hot gas stream which is branched off from the cooler and is brought to the crushing device 5' via the drying gas supply pipe 7'. However, a branch stream of the hot gas stream branched off from the cooler can also be utilised for the drying of the vegetable matter in the drying drum 37, as indicated by the pipe 7'a in FIG. 2. The vapours drawn off from the drying drum 37 can also be introduced into the cyclone separator 9' of the pneumatic conveyor dryer from whence they are returned to the cooler together with the cleaned exhaust gases from the drying process via the clean gas pipe 11'.

In the illustration according to FIG. 2 the crushing device 5' can also be equipped with an additional section 40 for drawing off the heavy parts from the sorted fluff.

I claim:

1. Method of utilising the heat energy of domestic and commercial refuse in a kiln installation containing a kiln and a cooler arranged after the kiln, especially for the manufacture of mineral structural materials, in which
    (a) a light fraction is sorted out of the crude refuse as so-called fluff, is crushed and fed as prepared valuable material to a pyrolysis reactor in which this valuable material is degassed with air excluded and heat delivered, yielding pyrolysis gas and pyrolysis residues.
    (b) the pyrolysis gas is delivered to the main burner of the kiln, optionally with the additional use of primary fuel,
characterised by the following features:
    (c) in order to obtain the valuable material, at least the crushed fluff is dried pneumatically to a dry substance content of at least approximately 78%, preferably approximately 88-92%, in a hot gas stream which is preferably branched off from the cooler of the kiln installation;
    (d) the valuable material thus obtained is fed to the pyrolysis reactor and degassed at low temperature, the pyrolysis reactor being indirectly heated with hot secondary air taken from the region of the junction between the kiln and the cooler and/or combustion gases from an auxiliary firing system or from the kiln;
    (e) the pyrolysis gas produced in the pyrolysis reactor, any quantity of primary fuel which may be necessary and the secondary air utilised for the indirect heating of the pyrolysis reactor are delivered to the main burner of the kiln.

2. Method as claimed in claim 1, characterised in that the crude refuse to be crushed is first sorted into the essentially non-combustible constituents such as sand, ash, metal, glass, stones and the like on the one hand and wet quantities of vegetable matter on the other hand, and the latter is subjected to a separate process of further preparation.

3. Method as claimed in claim 2, characterised in that the wet quantities of vegetable matter from the crude refuse are fed to a biogas reactor to produce biogas of high calorific value, at least some of which can also be delivered to the main burner of the kiln.

4. Method as claimed in claim 2, characterised in that the wet quantities of vegetable matter are also dried in a separate drying arrangement to a dry substance content of at least approximately 78%, preferably approximately 88-92%, and then brought together with the dried fluff in the region before the pyrolysis reactor, so that this dried vegetable matter and the dried fluff together form the prepared valuable material to be delivered for pyrolysis.

5. Method as claimed in claim 4, characterised in that a branch stream of the hot gas stream branched off from the cooler is used for the drying of the wet quantities of vegetable matter, and the vapours drawn off from the drying arrangement are returned to the cooler.

6. Method as claimed in claim 1, characterised in that the hot gas stream used for drying of the crushed fluff is drawn off from the rear region of the cooler, and the cooled gas stream is returned to the cooler as cooling gas after drying and precipitation of the fluff.

7. Method as claimed in claim 1, characterised in that a degasification temperature of approximately 500°-600° C., preferably in the region of approximately 550° C., and a static absolute pressure between 75 and 110 kPa are maintained in the pyrolysis reactor, and the combustion of the pyrolysis gas produced takes place in the main burner of the kiln at a temperature clearly above 1200° C.

8. Method as claimed in claim 7, characterised in that the combustion of the pyrolysis gas takes place in the main burner at a kiln charge temperature of approximately 1450° C. and a flame temperature of approximately 2000° C.

9. Apparatus for carrying out the method as claimed in claim 1, containing
    (a) a kiln (1) which has a main burner and a cooler (2) arranged after this kiln,
    (b) a preparation arrangement with devices (4, 5) for sorting and crushing crude refuse,
    (c) a pyrolysis reactor (10) which is connected to the preparation arrangement (4, 5) and has a feed arrangement (15) on its inlet side, a heating arrangement (17) and a discharge arrangement (16) for pyrolysis residues and pyrolysis gas on its outlet side,
    (d) a pyrolysis gas pipe (23), which connects the outlet side of the pyrolysis reactor (10) to the main burner (20) of the kiln (1),
    (e) a kiln outlet head (3) which connects the material discharge end of the kiln (1) to the cooler (2),
characterised in that
    (f) a pneumatic conveyor dryer with a pipe run (8) and a cyclone separator (9) is arranged in the region between the preparation arrangement (4, 5) and the pyrolysis reactor (10), and this dryer is connected to the cooler (2) on the one hand by means of a drying gas supply pipe (7) and on the other hand by a clean gas pipe (11) leading out of the cyclone separator (9);
    (g) the pyrolysis reactor (10) is a reactor which is indirectly heated with hot secondary air from the kiln outlet head (3) and can be operated with air at least to a large extent excluded and from which, in addition to the pyrolysis gas pipe (23), a second gas pipe (19) for used secondary air is brought to the main burner (20) of the kiln (1).

10. Apparatus as claimed in claim 9, characterised in that the pipe run (8) of the pneumatic conveyor dryer leads out of the preparation arrangement (4, 5) in the region of the crushing device (5, 5a), is connected in this region to the drying gas supply pipe (7) coming from the cooler (2) and opens with its opposite end (8a) into the cyclone separator (9).

11. Apparatus as claimed in claim 9, characterised in that a separate blower (24, 32, 12), is arranged in each case in the pyrolysis gas and secondary gas pipes (23, 19) leading from the pyrolysis reactor (10) to the main burner (20) of the kiln (1) and in the clean gas pipe (11) connecting the cyclone separator (9) to the cooler (2).

12. Apparatus as claimed in claim 9, characterised in that an indirectly heated rotary drum reactor (10) which is inclined towards its outlet side and has its inlet and outlet sides constructed so as to be substantially airtight is provided as the pyrolysis reactor.

13. Apparatus as claimed in claim 9, characterised in that the kiln provided is a rotary kiln (1).

14. Apparatus as claimed in claim 9, characterised in that the sorting device (4, 4') of the preparation arrangement is constructed at least for sorting of the crude refuse into a pyrolysable light fraction (fluff), a wet vegetable fraction and a non-pyrolysable fine refuse fraction.

15. Apparatus as claimed in claim 14, characterised in that a separate drying arrangement (37) for the wet vegetable fraction is arranged after the sorting device (4') and this drying arrangement is connected to the pyrolysis reactor (10').

16. Apparatus as claimed in claims 9 or 15, characterised in that an intermediate bunker (35) to receive and further convey the prepared valuable material to the pyrolysis reactor (10, 10') is arranged before the said reactor.

* * * * *